United States Patent
Favret, Jr.

(10) Patent No.: US 6,238,569 B1
(45) Date of Patent: May 29, 2001

(54) FLOTATION PILE OIL/WATER SEPARATOR APPARATUS

(75) Inventor: Uncas B. Favret, Jr., Covington, LA (US)

(73) Assignee: Engineering Specialties, Inc., Covington, LA (US)

(*) Notice: Subject to any disclaimer, the term of this patent is extended or adjusted under 35 U.S.C. 154(b) by 0 days.

(21) Appl. No.: 09/338,399

(22) Filed: Jun. 22, 1999

(51) Int. Cl.[7] .................................................... C02F 1/24
(52) U.S. Cl. ................................ 210/710; 210/221.2
(58) Field of Search .......................... 210/221.2, 221.1, 210/170

(56) References Cited

U.S. PATENT DOCUMENTS

| | | |
|---|---|---|
| 2,730,190 | * 1/1956 | Brown et al. . |
| 3,893,318 | 7/1975 | King, Jr. et al. . |
| 4,173,533 | 11/1979 | Williams . |
| 4,198,300 | 4/1980 | Williams .......................... 210/170 |
| 4,252,649 | 2/1981 | Favret, Jr. ........................ 210/800 |
| 4,372,757 | 2/1983 | Favret, Jr. . |
| 4,428,841 | 1/1984 | Favret, Jr. ........................ 210/747 |
| 4,720,341 | * 1/1988 | Arnold . |
| 4,927,536 | 5/1990 | Worrell et al. .................. 210/512.2 |
| 4,948,517 | 8/1990 | Young et al. .................... 210/767 |
| 5,078,921 | * 1/1992 | Zipperian . |
| 5,543,043 | * 8/1996 | Bates et al. . |
| 5,580,463 | * 12/1996 | Hubred . |
| 5,584,995 | * 12/1996 | Meekel et al. . |
| 5,897,772 | * 4/1999 | Chang et al. . |

OTHER PUBLICATIONS

He et al, "A Multiple—Loop Flotation Column for Wastewater Treatment" Separation Technology vol. 5, 1995 pp. 133–138, Mar. 1995.*

Finch and Dobby, "Column Flotation", Copyright 1990, Published by Pergamon Press pp. 32–33, 1990.*

* cited by examiner

Primary Examiner—Thomas M. Lithgow
(74) Attorney, Agent, or Firm—Garvey, Smith, Nehrbass & Doody, LLC

(57) ABSTRACT

A wastewater treatment apparatus for use in an offshore marine environment includes a vertically elongated vessel having upper and lower end portions, wherein at least half of the vessel is submerged during use. The vessel provides an interior for containing fluid during use and is attachable to an offshore marine structure such as a fixed platform or floating marine rig. An influent flow line adds produce wastewater to the interior of the vessel. An effluent is provided for discharging treated fluid from the vessel interior. The upper end portion of the vessel interior defines a free oil separation section, the lower end portion of the vessel interior defines a disposal caisson section. The middle section of the vessel interior defines an induced gas flotation section. A plurality of spargers are provided at the gas flotation section for emitting bubbles at multiple elevational positions within the middle section of the vessel interior. A plurality of inclined baffles are positioned at respective multiple elevational positions within middle section of the vessel interior, a baffle section being positioned next to each of the spargers. Vertical pipe associated with each baffle enables oil that accumulates below a baffle to flow upwardly in the vessel. An oil removal flow line is provided for removing oil from the upper section of the vessel interior after it has accumulated at the upper end portion of the vessel interior. The vessel lower section communicates with the discharge for discharging treated water from the vessel interior after it has been treated.

51 Claims, 13 Drawing Sheets

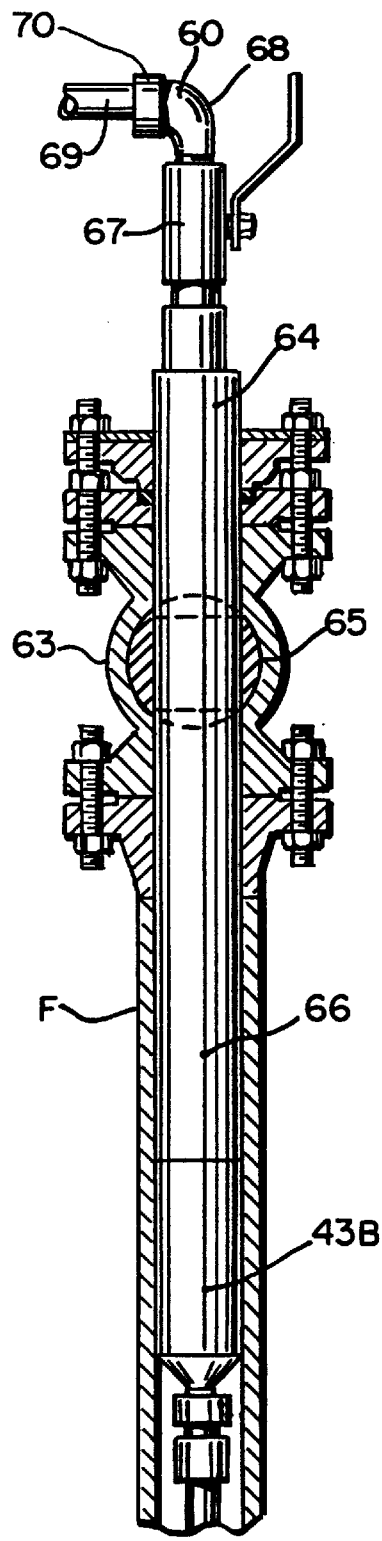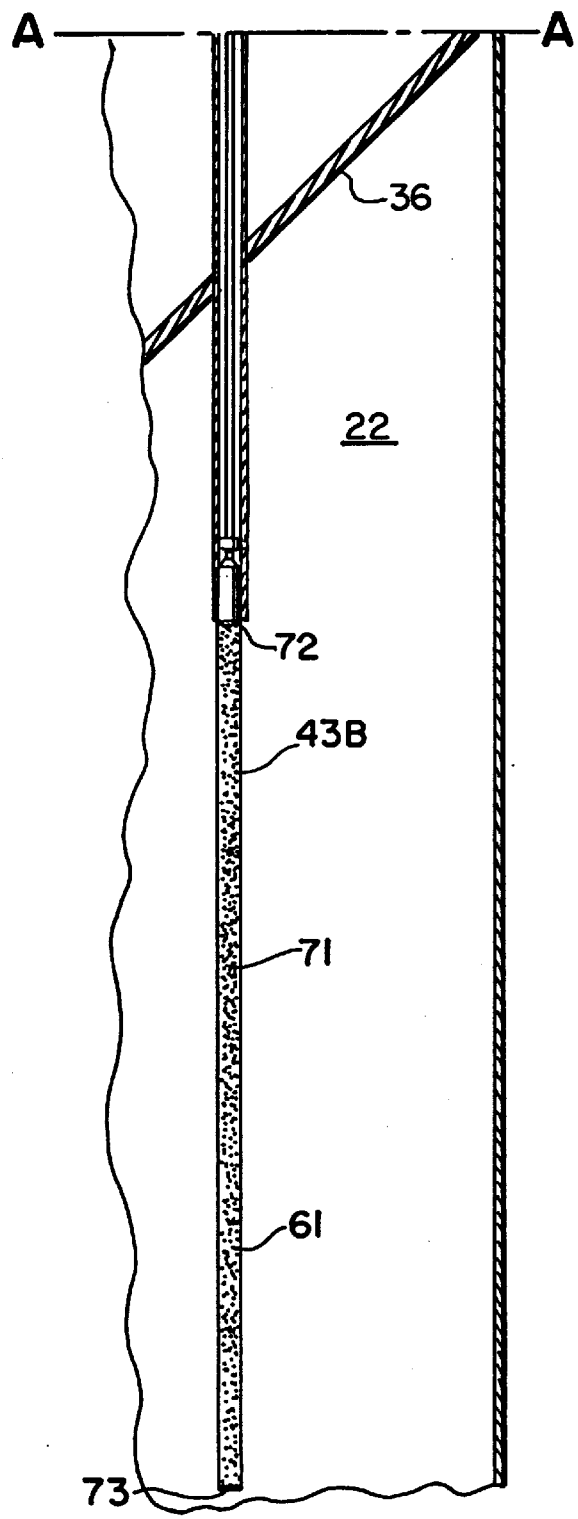
FIG. 9.
FIG. 8B.

FLOTATION PILE OIL/WATER SEPARATOR APPARATUS

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to wastewater treatment and particularly to an improved separator apparatus for separating oil from influent produced water, such as the wastewater generated from oil and gas well drilling and production operations. More particularly, the present invention relates to an improved flotation pile oil/water separation apparatus that includes an elongated, vertically supported flotation pile having an upper inlet end portion, a lower outlet end portion, and three zones for waste treatment including a free oil removal zone, an induced gas flotation zone, and a lower disposal zone.

2. General Background of the Invention

In the oil and gas well drilling industry, offshore platforms that are used in the drilling and production of oil and gas wells generate wastewater material that must be treated. This wastewater material is typically produced water that includes tiny droplets of oil. These droplets of oil must necessarily be removed from the waste stream before the treated water can be returned to the surrounding marine environment. Indeed, the oil must be removed sufficiently so that the water is clean enough to be discharged into the surrounding marine environment without adversely affecting marine plants and animals.

Patents have been issued that are directed to the concept of a flotation pile that is used to remove oil from sea water at an offshore oil platform. One example is U.S. Pat. No. 4,198,300.

Other patents that relate to the cleaning of produced water in the oil and gas well drilling and production environment include U.S. Pat. Nos. 4,252,649; 4,372,757; and 3,893,318.

BRIEF SUMMARY OF THE INVENTION

The apparatus of the present invention provides an improved wastewater treatment apparatus for use in a marine environment.

The present invention provides an improved wastewater treatment apparatus in the form of a flotation pile that combines many features in one vessel.

The present invention provides for solids cleaning and disposal and is adaptable to existing sump caissons.

The apparatus of the present invention can be used by fixed production facilities or floating production facilities and in either shallow or deep water applications.

The apparatus of the present invention can be used for produced water and open drain cleaning and disposal.

In the preferred embodiment, the apparatus includes an induced gas flotation section that includes multiple gas spargers positioned at differing elevational positions.

The apparatus includes a vertically elongated vessel having upper and lower end portions and an interior for containing fluid during use.

The apparatus of the present invention is preferably generally vertically oriented and placed in the surrounding marine environment so that little or no deck space is required for its operation.

Because the large majority of the vessel is under water during use, minimal platform weight is required. The apparatus of the present invention is a simple basic device that has no moving parts and therefore has low maintenance.

The vessel attaches to an offshore marine structure for example, at the boat deck portion thereof, a majority of the vessel being preferably submerged during use.

An influent flow line enables produced wastewater to be added to the interior of the vessel.

An effluent is provided for discharging fluid from the vessel interior.

The upper end portion of the vessel interior defines a free oil separation zone or section. The lower end portion of the vessel interior defines a disposal zone or section. The middle section of the vessel interior defines an induced gas flotation section.

A plurality of spargers are placed at differing elevational positions, each sparger emitting gas bubbles. The spargers are preferably placed within the middle (induced gas flotation) section of the vessel interior.

A plurality of inclined baffles can be positioned at respective multiple elevational positions within the middle section of the vessel interior. Oil removal flow lines are provided for removing oil from the upper section of the vessel interior.

A lower section of the vessel interior communicates with the discharge to discharge treated water from the vessel interior via a discharge flow line.

The discharge outlet can be an opening at the bottom of the vessel that communicates directly with the surrounding marine environment to discharge water after it has been sufficiently cleaned. The discharge outlet can also be a discharge pipe arrangement.

The spargers are positioned at preferably multiple (e.g. 3, 4) separate elevational positions.

The inclined baffles are positioned at differing elevational positions, one or two inclined baffles being preferably positioned next to of the spargers at a given level. The inclined baffles are preferably positioned in pairs at each different elevational position. Each pair of baffles at a given elevational position is circumferentially spaced (preferably ninety degrees) from the pair of baffles above it or below it.

When a discharge piping arrangement is used, the discharge outlet preferably communicates with an outlet flow line that extends to an elevational position near the fluid surface elevation inside the vessel interior in one embodiment.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIGS. 8A–8B are sectional elevational views of the preferred embodiment of the apparatus of the present invention illustrating a sparger portion thereof, wherein the line A—A in FIG. 8A and the line A—A in FIG. 8B are match lines;

FIG. 9 is a partial sectional elevational view of the preferred embodiment of the apparatus of the present invention illustrating the upper end portion of a sparger;

DETAILED DESCRIPTION OF THE INVENTION

Figure 1A:
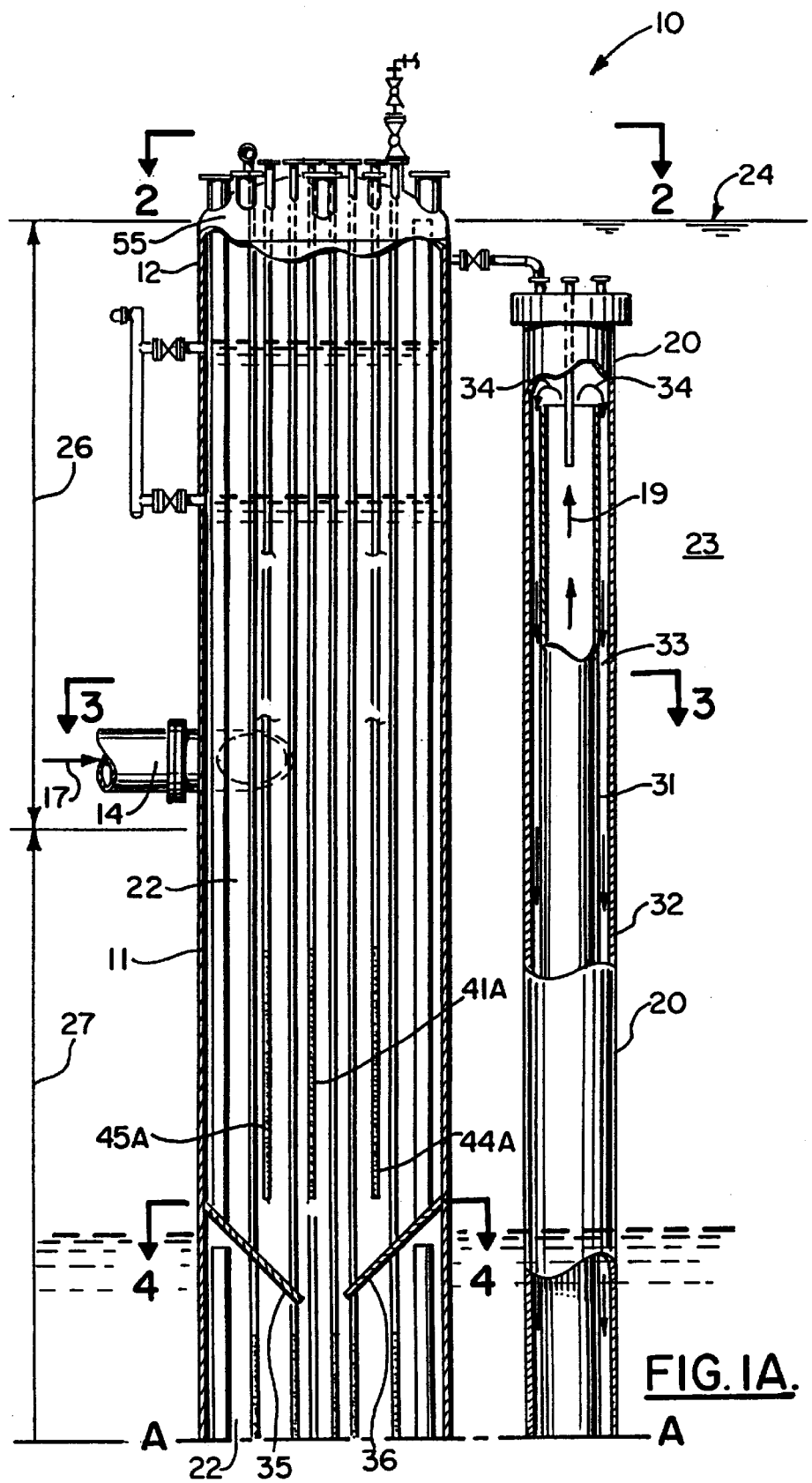
FIGS. 1A–1B are sectional elevational views of the preferred embodiment of the apparatus of the present invention, wherein the line A—A in FIG. 1A and the line A—A in FIG. 1B are match lines.
Figure 1B:
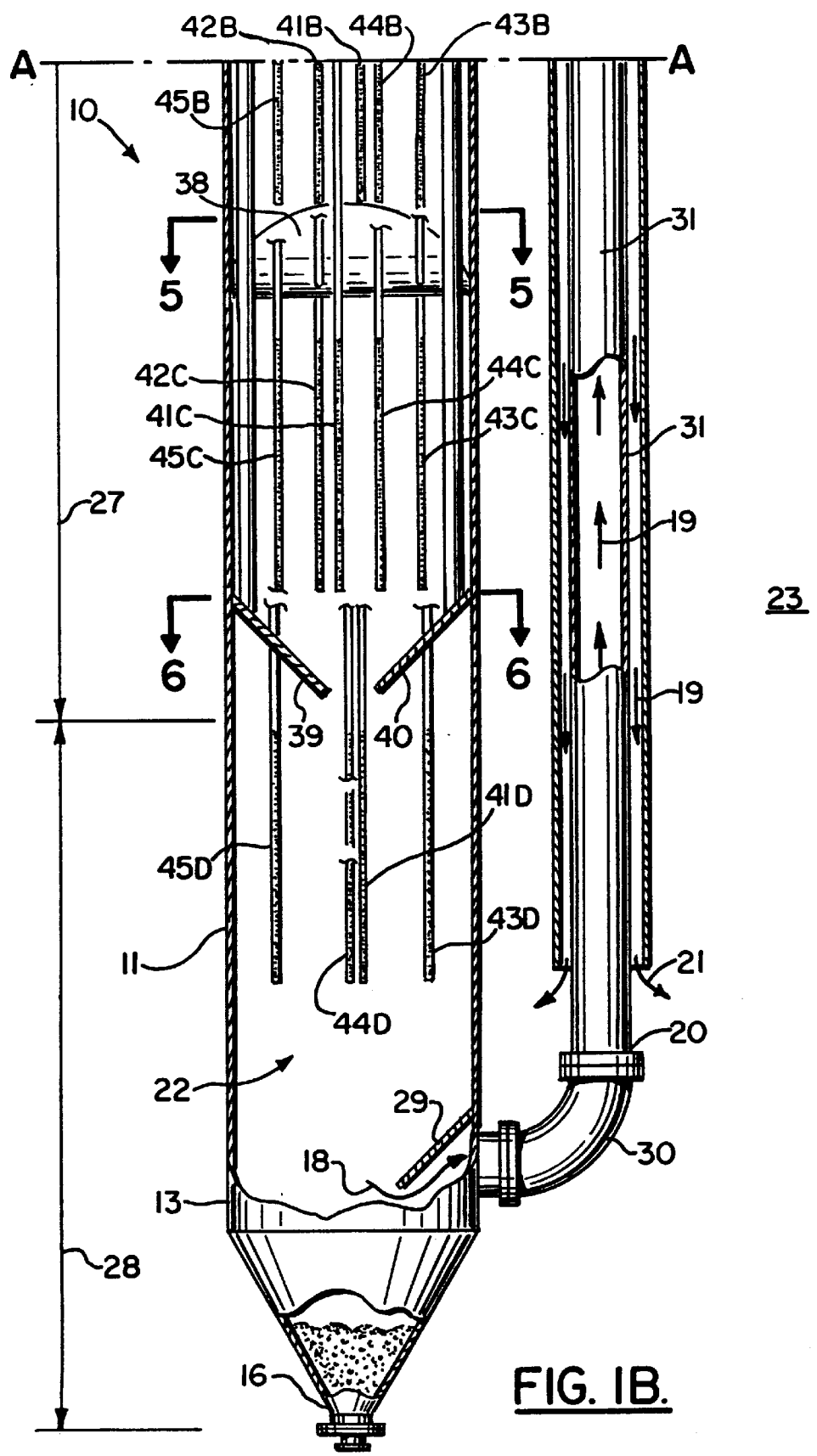
Figure 12:
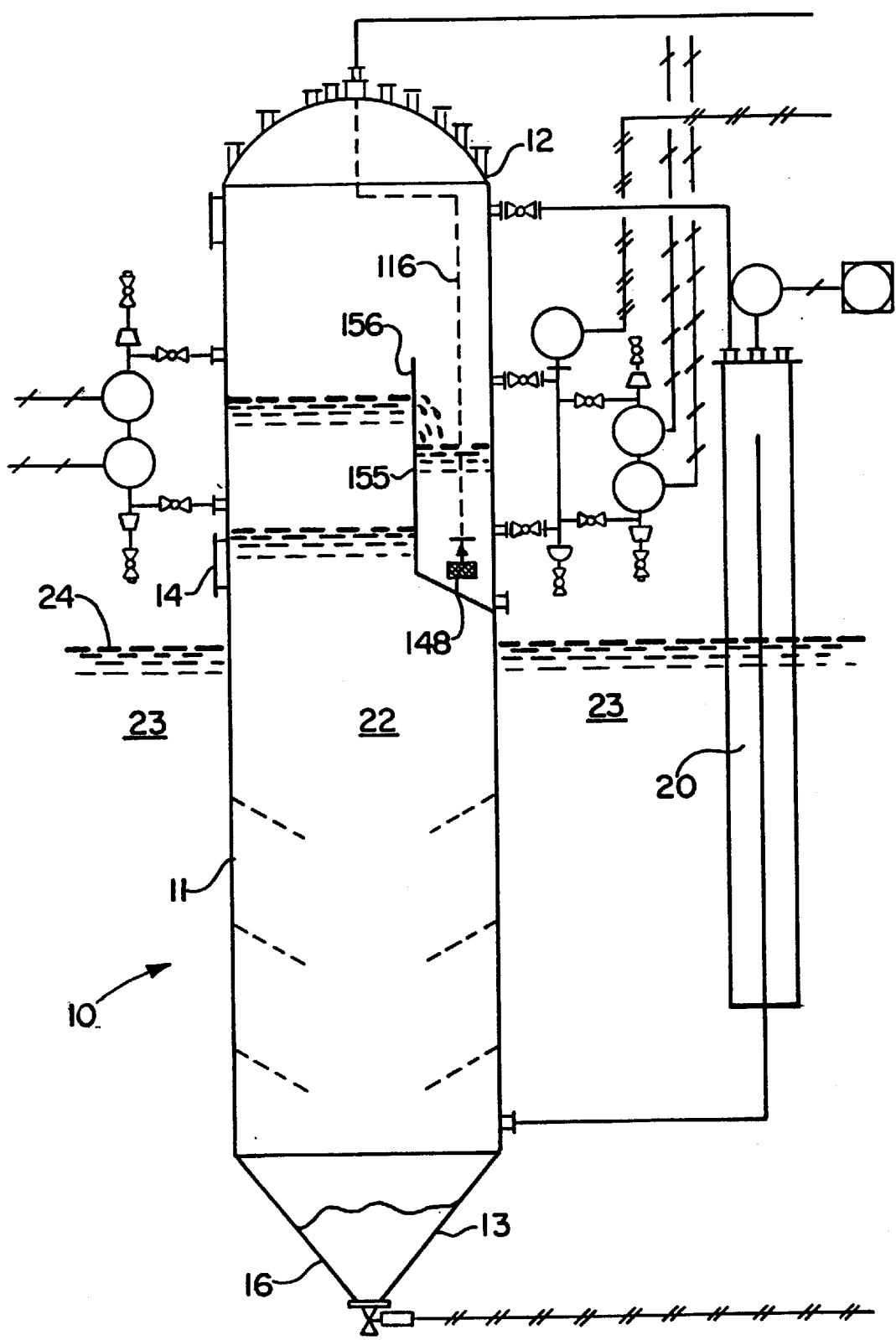
FIG. 12 is a fragmentary, sectional, elevational view of the preferred embodiment of the apparatus of the present invention.

FIGS. 1A–1B, 2–9 and 12–15 show the preferred embodiment of the apparatus of the present invention, designated generally by the numeral 10 in FIGS. 1A, 1B. Flotation pile apparatus 10 includes an elongated vessel 11 having an upper end portion 12, a lower end portion 13 and an inlet 14 for receiving wastewater, such as produced water. The vessel 11 can also be vented at vent 15. Gas exiting vent 15 can be burned with an LP flare, transmitted to a vapor recovery unit, recompressed and sold, or used on the platform. The lower end portion 13 of vessel 11 has an outlet 16 for discharging solids that settle to the bottom (disposal caisson zone 28) of vessel 11. The flow of fluid through vessel 11 is indicated schematically by arrows 17, 18, 19 and 21. In FIGS. 1A and 12, wastewater or produced water enters the interior 22 of vessel 11 at produced water inlet 14. The wastewater then flows downwardly until it reaches the lower end portion 13 of vessel 11. In FIG. 1B, arrow 18 indicates the flow of produced water that has been treated, under baffle 29 and into sea water outlet pipe 20. The treated water enters elbow fitting 30 of sea water outlet pipe 20. Treated water then proceeds vertically upwardly in inner pipe 31 as shown by arrow 19.

At the upper end portion of sea water outlet pipe 20, water spills over the upper end of inner pipe 31 as shown by arrows 34 in FIG. 1A. Water enters the space in between inner pipe 31 and outer pipe 32. The water then flows downwardly as indicated by arrows 19, 21 in FIG. 1B, until the treated water is discharged into the surrounding sea water 23. In FIG. 1A, the sea level 24 is schematically indicated as being near the upper end 12 of vessel 11. In FIG. 1A, the upper end of sea water outlet pipe 20 is shown as being below sea level 24. However, it should be understood that the upper end of sea water outlet pipe 20 could be above sea level 24.

Figure 10:
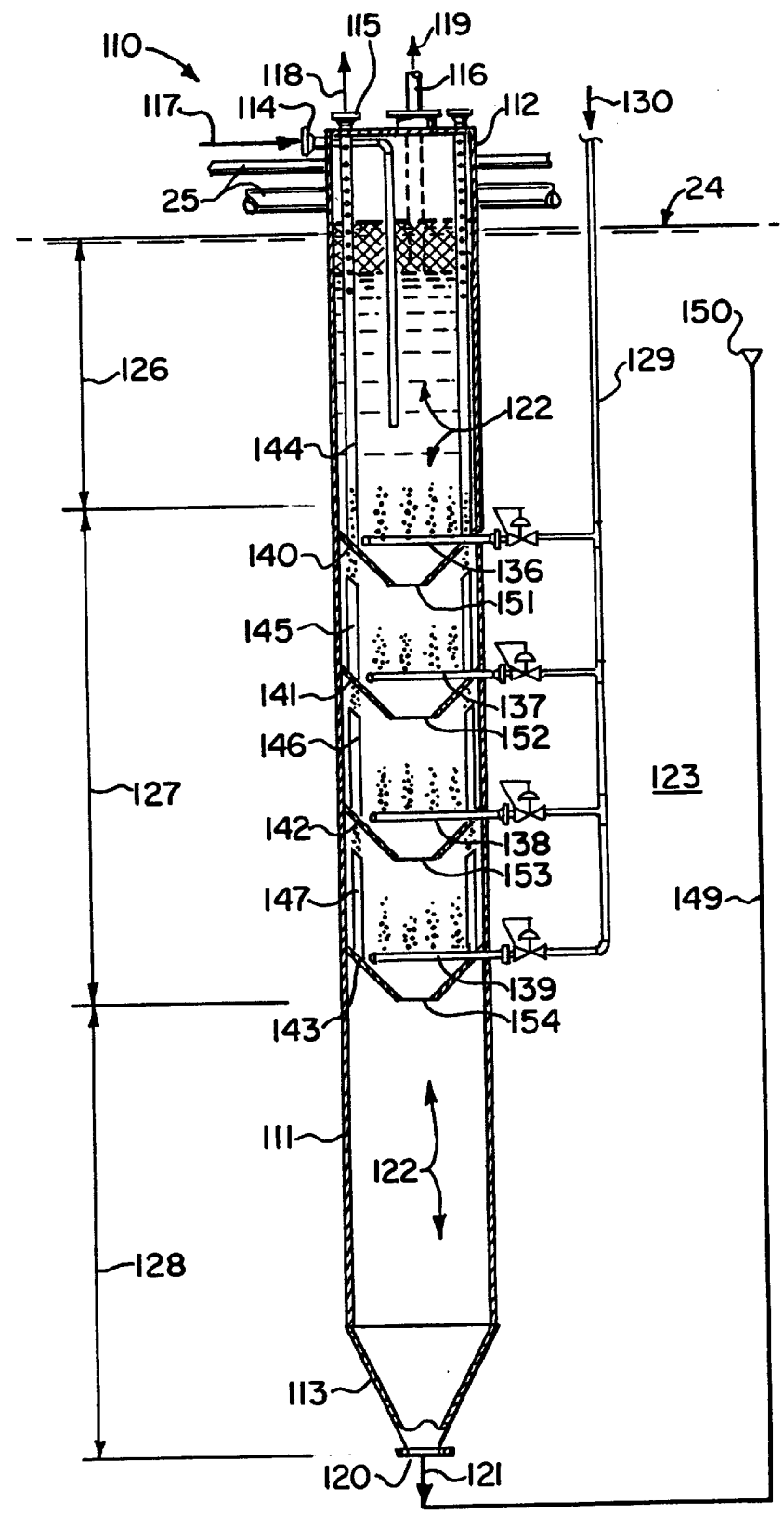
FIG. 10 is an elevational view illustrating an alternate embodiment of the apparatus of the present invention.
Figure 11:
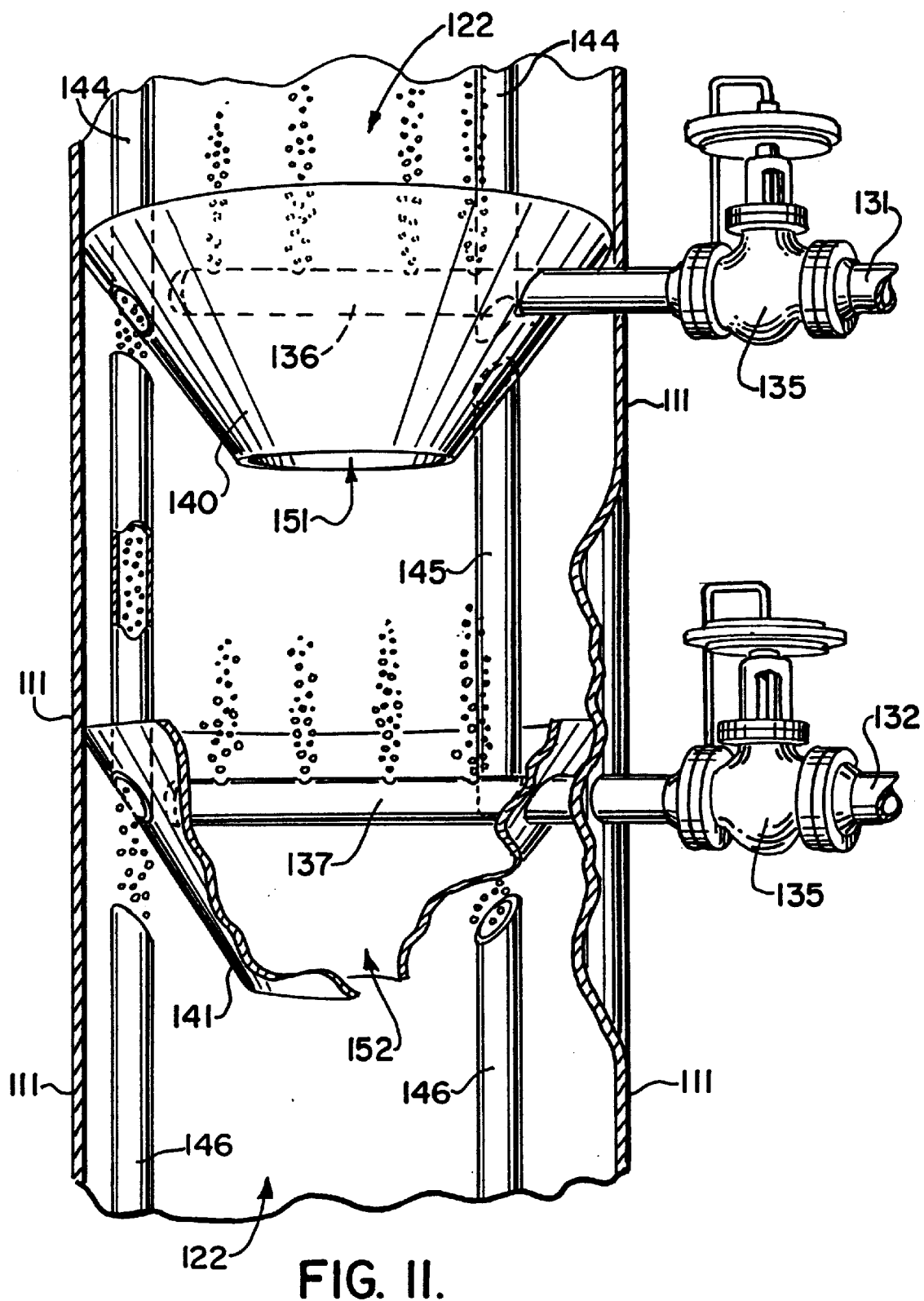
FIG. 11 is a partial perspective view of the alternate embodiment of the apparatus of the present invention.

In the preferred embodiment of FIGS. 1A, 1B, 2–9 and 12–15, and in the alternative embodiment of FIGS. 10 and 11, the vessel 11 (FIGS. 1–9) or the vessel 111 (FIGS. 10–11) could be attached to a rig, offshore platform or semi-submersible at boat deck 25, for example by welding it to the boat deck 25. Because the majority of vessel 11 or 111 is submerged, it is buoyed by the surrounding sea water 23 so that boat deck 25 loads are minimized.

The apparatus 10 of the present invention provides a plurality of treatment zones for the produced water or wastewater that enters the interior 22 of vessel 11 at produced water inlet 14. These treatment zones include a free oil removal zone 26 that is schematically illustrated by the arrow 26 in FIG. 1A, an induced gas flotation zone 27 indicated by arrow 27 in FIGS. 1A and 1B, and a disposal caisson zone 28 indicated by arrow 28 in FIG. 1B.

The free oil removal zone 26 is positioned next to the upper end portion 12 of vessel 11 and defines that portion of the vessel 11 interior 22 that collects and accumulates oil that has been removed from the produced water and wastewater that enters vessel 11 interior 22 at produced water inlet 14. In the induced gas flotation zone 27, a plurality of spargers positioned at various depths produce tiny bubbles of gas for floating tiny droplets of oil upwardly so that they can be collected in the free oil removal zone 26.

The disposal caisson zone 28 is that portion of the vessel 11 next to lower end portion 13 wherein solids are collected for discharge through solids outlet 16. In the disposal caisson zone 28, water that has been treated and oil removed therefrom can exit the vessel 11 interior 22 and enter the surrounding sea water 23. The induced gas flotation zone 27 can provide a plurality of baffles 35–40 that are arranged in pairs, each pair positioned at a different elevational position of vessel 11, namely spaced vertically between the upper end portion 12 and the lower end portion 13. Additionally, the baffles 35–40 are placed in different circumferential positions in vessel 11 as show in FIGS. 4, 5 and 6.

Figure 4:
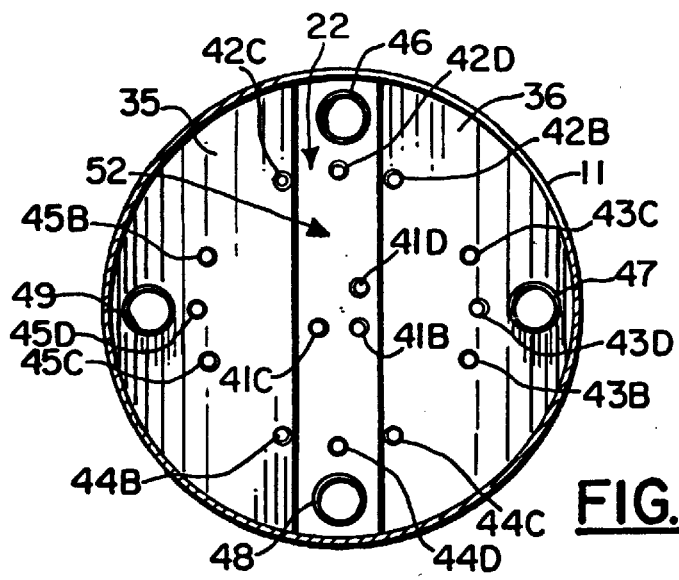
FIG. 4 is a sectional view taken along lines 4—4 in FIG. 1A.

The baffles 35–40 include a first pair of baffles 35, 36 as shown in FIG. 1A and 4. The baffles 35, 36 continuously engage vessel 11 along a curved surface of the respective baffle, and each baffle 35, 36 presents a flat edge to a space 52 in between the baffles 35, 36. Similarly, there is a space 53 in between the middle pair of baffles 37, 38. The lower pair of baffles 39, 40 have a space 54 therebetween. These spaces 52, 53, 54 enable wastewater to flow downwardly, and some oil and gas bubbles to rise upwardly in the vessel 11.

The baffles 35–40 are preferably inclined. Each baffle 35–40 forms a seal with the wall of vessel 11. Oil droplets that engage the underside of a baffle 35–40 can only move upwardly within vessel 11 by entering one of the plurality of oil risers 46–51. By comparing FIGS. 4, 5 and 6, it can be seen that each pair of baffles is rotated 90 degrees with respect to the pair of baffles above or below it. The pair of baffles 35, 36 in FIG. 4 is rotated 90 degrees with respect to the baffles 37, 38 that are below the baffles 35, 36. Likewise, the pair of baffles 39, 40 is rotated 90 degrees with respect to the baffles 37, 38 that are above the baffles 39, 40.

Figure 5:
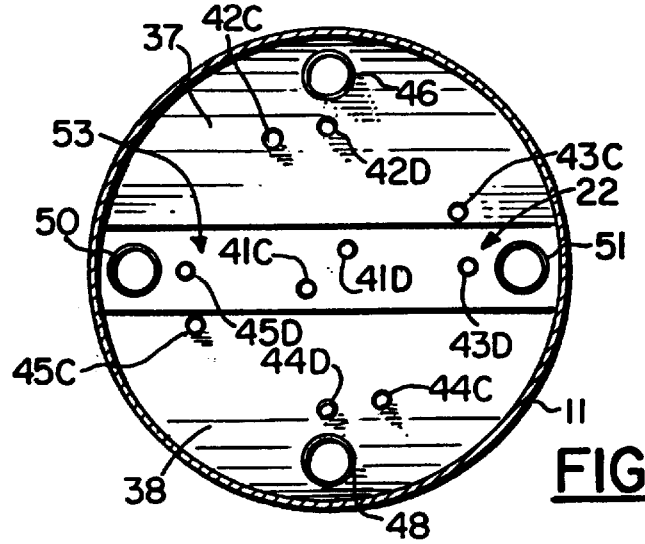
FIG. 5 is a sectional view taken along lines 5—5 in FIG. 1B.
Figure 6:
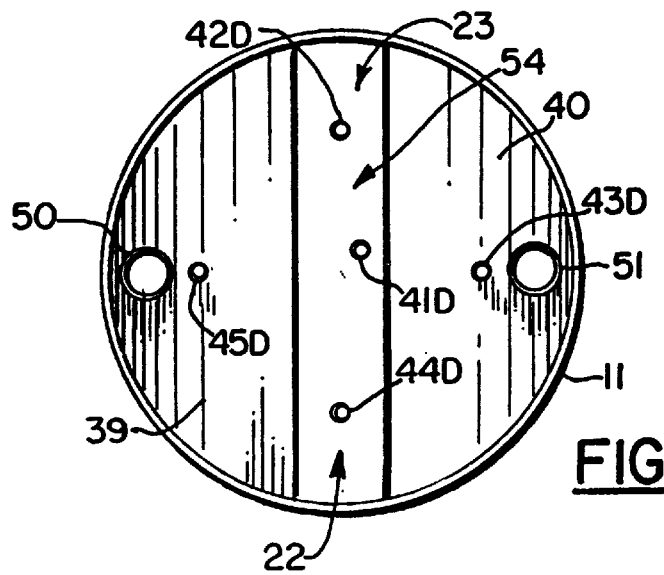
FIG. 6 is a sectional view taken along lines 6—6 in FIG. 1B.
Figure 7:
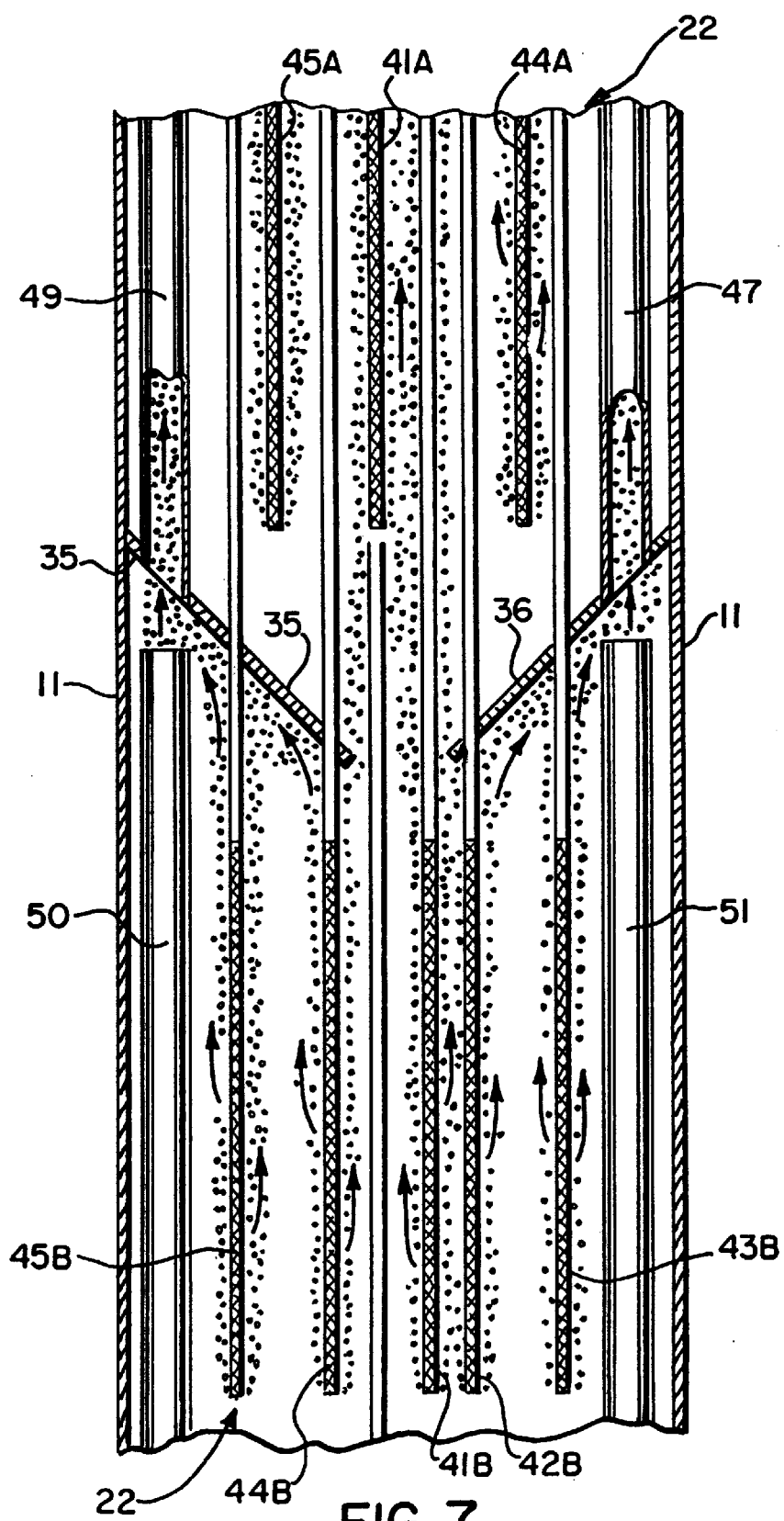
FIG. 7 is a partial sectional elevational view of the preferred embodiment of the apparatus of the present invention.

The oil risers 46–51 are positioned approximately 90 degrees apart as shown in FIGS. 4–6. At the elevation of baffles 35, 36, oil risers 46, 48 are positioned in the space 52 that is in between baffles 35, 36. Oil risers 47, 49 pass through openings in baffles 35, 36 and are connected (e.g. welded) to baffles 35, 36. The oil risers 47, 49 have respective lower end portions that terminate at baffles 35, 36. The oil risers 46, 48 terminate at baffles 37, 38 respectively. The oil risers 50, 51 have lower end portions that terminate at baffles 39, 40 respectively. The upper end portion of oil risers 50, 51 terminate just below baffles 35, 36. The oil risers 46–49 have oil outlet perforations at oil removal zone 26. In this fashion, each of the baffles 35–40 collects oil, and provides a riser pipe that enables oil collected on the bottom of a baffle to move upwardly in the oil riser for accumulation at the upper end portion of vessel 11 in the oil removal zone 26.

Figure 13:
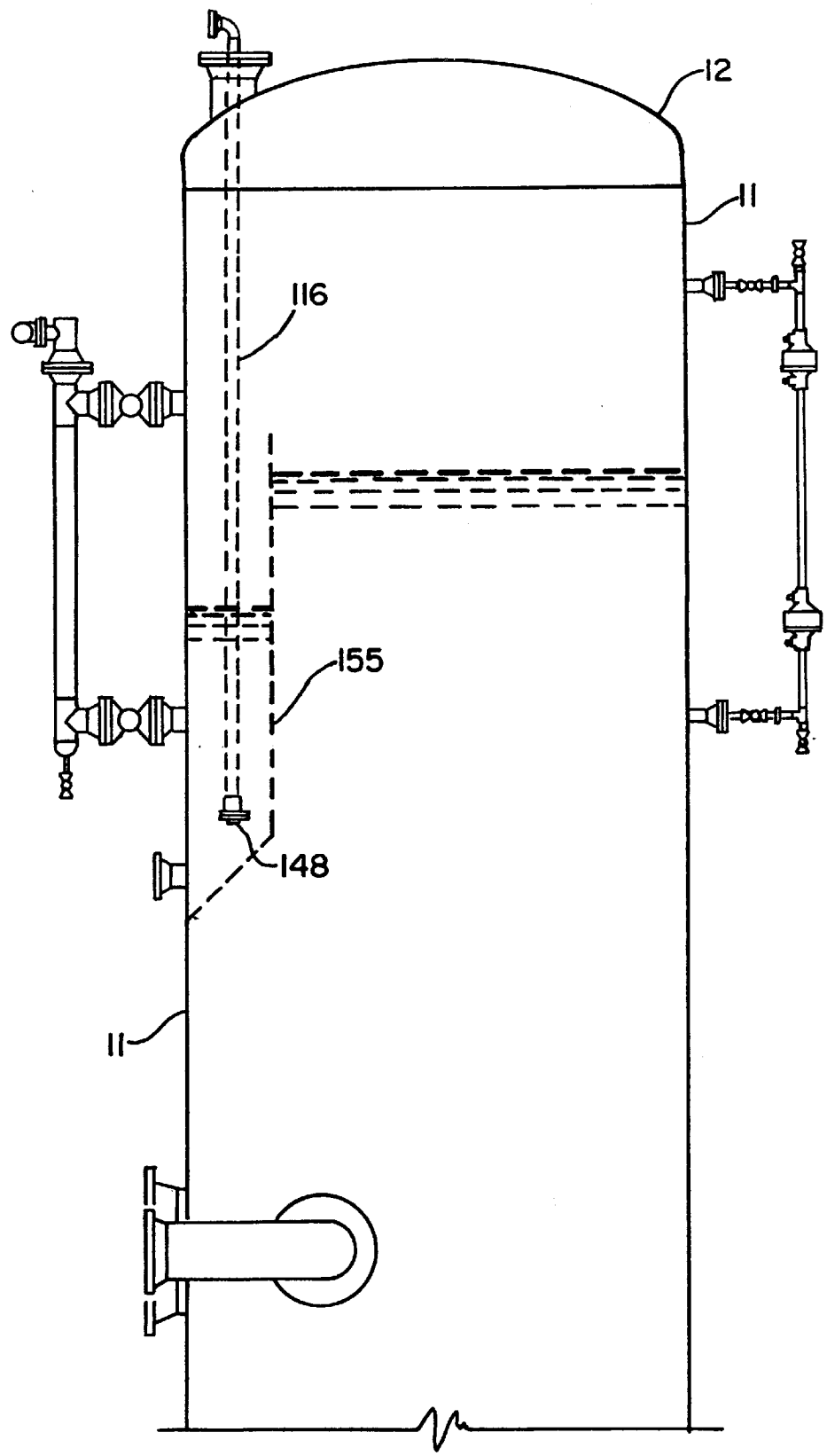
FIG. 13 is another fragmentary, elevational view of the preferred embodiment of the apparatus of the present invention.

In FIGS. 12–13, a suction intake 148 can be provided for transmitting oil from the oil accumulation zone 126 upwardly through oil outlet 116 for storage. An oil bucket 155 can be used to accumulate oil that is collected by the oil risers 46–51. An adjustable weir 156 can be used to adjust the level at which oil will be decanted to oil bucket 155.

Figure 14:
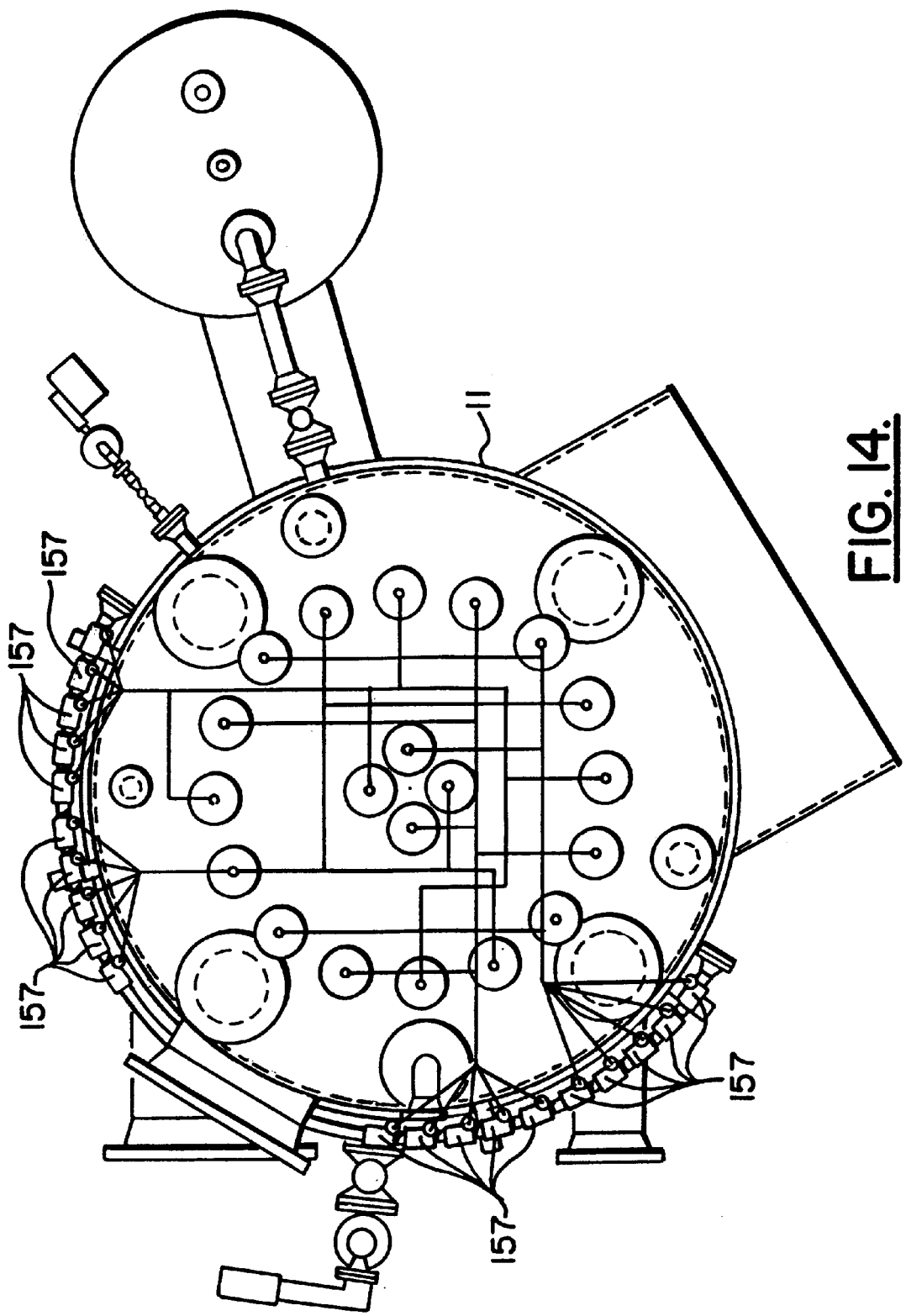
FIG. 14 is a plan view of the preferred embodiment of the apparatus of the present invention.
Figure 15:
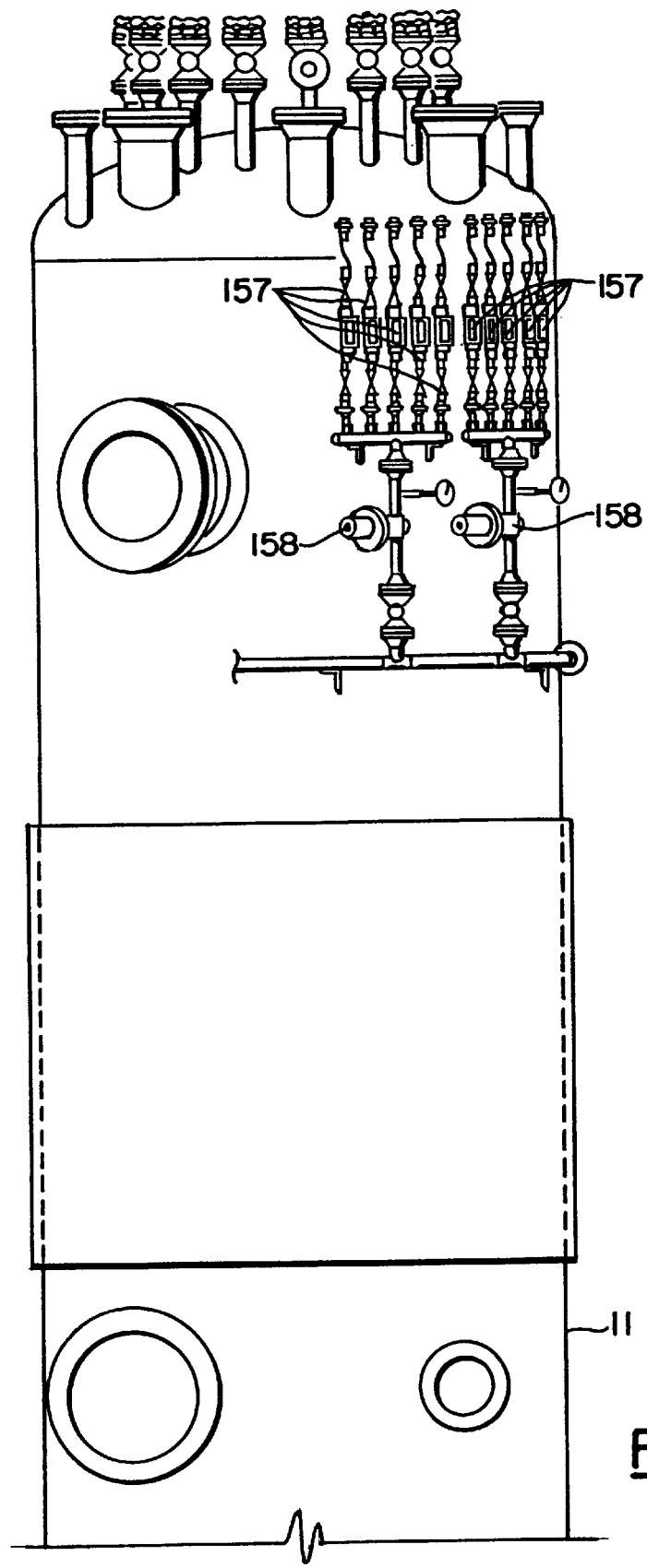
FIG. 15 is a fragmentary, elevational view of the preferred embodiment of the apparatus of the present invention illustrating the flow meter placement.

In FIGS. 14 and 15, flow meters 157 can be used to monitor the gas flow to each sparger. Pressure regulators 158 (FIG. 15) can be used to control the pressure of gas discharged by each sparger. Higher pressures are used for spargers at greater depths so that bubble size at every depth is the same, about 2–50 nmicrons.

Figure 2:
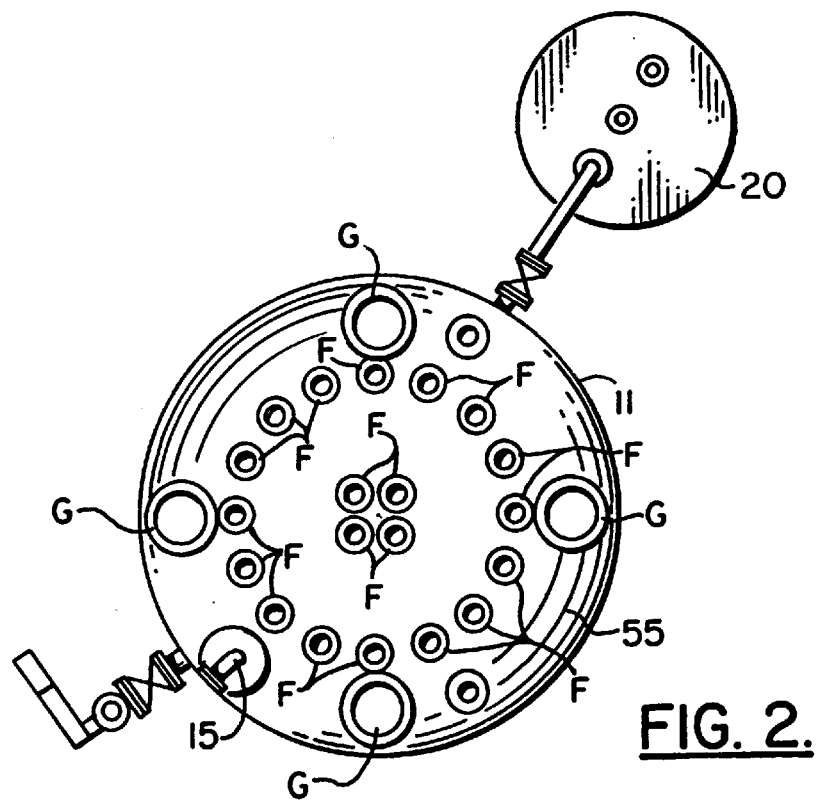
FIG. 2 is a top view of the preferred embodiment of the preferred embodiment of the apparatus of the present invention taken along lines 2—2 in FIG. 1A.
Figure 3:
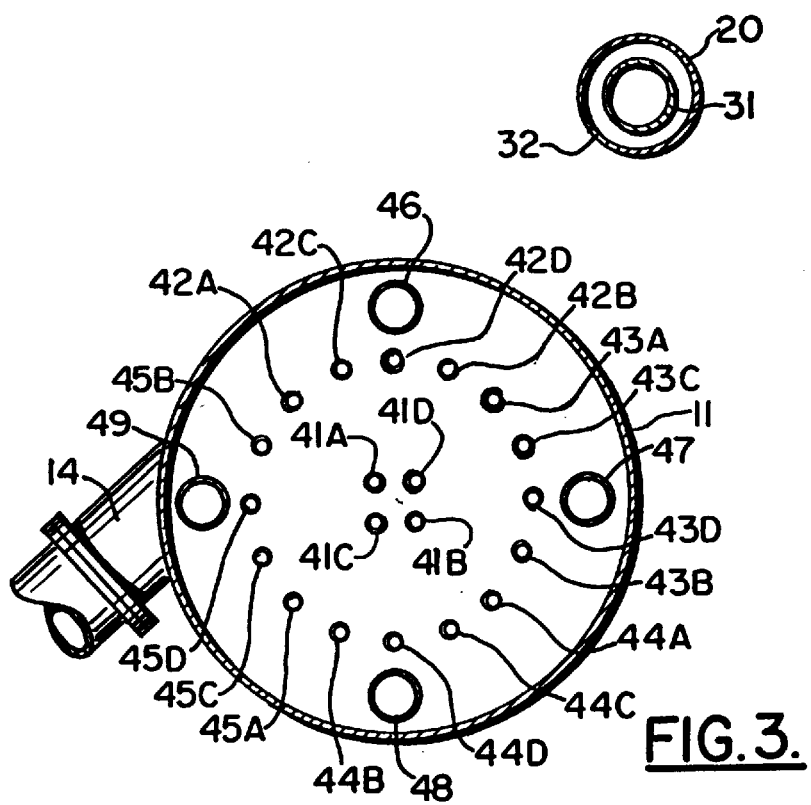
FIG. 3 is a sectional view taken along lines 3—3 in FIG. 1A.

In FIGS. 1A, 1B and 2–7, there can be seen a plurality of sparger lines 41A–45A, 41B–45B, 41C–45C, and 41D–45D. Each of these sparger lines has an upper end portion that extends through a fitting F of the cap 55 at the upper end portion of vessel 11. In FIG. 2, cap 55 of vessel 11 carries a plurality of fittings F each supporting a different sparger line. Cap 55 provides a plurality of fittings G that support oil risers 46–49 and enable inspection and cleaning of them.

The construction of each sparger line is shown in FIG. 7, 8A, 8B and 9. The sparger lines each provide an upper non-porous end portion that is attached to cap 55 and more particularly to a fitting F.

The lower end portion of each sparger line is porous to provide a bubbler portion that extends downwardly into interior 22 of vessel 11. These sparger lines have lower end portions that terminate at selected levels. Different pressure values are associated with spargers at different elevations. Deeper spargers have higher pressure values for discharging gas. This ensures that bubbles emitted by each sparger, notwithstanding elevation of the sparger, will be very small. The bubbles are preferably between about 2–50 microns in diameter. Each sparger is preferably vertically oriented so that it will not plug as easily. In the preferred embodiment, five lowest level sparger lines extend to a given level. For example, in FIG. 1B, the lowest level to which sparger lines extend is the disposal caisson zone 28. In FIG. 1B, there are five sparger lines 41D, 42D, 43D, 44D, and 45D (see FIGS. 1B and 6).

A second plurality of sparger lines includes five sparger lines that are at the lower end portion of the induced gas flotation zone 27. These five sparger lines include 41C, 42C, 43C, 44C and 45C. The sparger lines 41C, 42C, 43C, 44C, 45C are positioned just above the lowest baffles 39, 40 as shown in FIG. 1B.

A third plurality of sparger lines extends to a position just above the baffle plates 37, 38 as shown in FIG. 1B, and in between the upper pair of baffle plates 35, 36 and the middle pair of baffle plates 37, 38. This third plurality of sparger lines includes sparger lines 41B, 42B, 43B, 44B, and 45B.

A fourth set of sparger lines extends to a position just above the highest pair of baffle plates 35, 36. These include sparger lines 41A, 42A, 43A, 44A, 45A (see FIGS. 1A and 3). In this fashion, a total of twenty (20) sparger lines are supported from the fittings F on cap 55 of vessel 11. Five sparger lines terminate just above baffle plates 35, 36. An additional five sparger lines terminate just above baffle plates 37, 38. A third plurality of five sparger lines extends to a position just above baffle plates 39, 40 and a fourth set of five sparger lines extends below baffle plates 39, 40. At each level, spargers are spaced apart circumferentially and radially spaced to cover the full transverse cross sectional area of vessel interior 22.

Figure 8A:
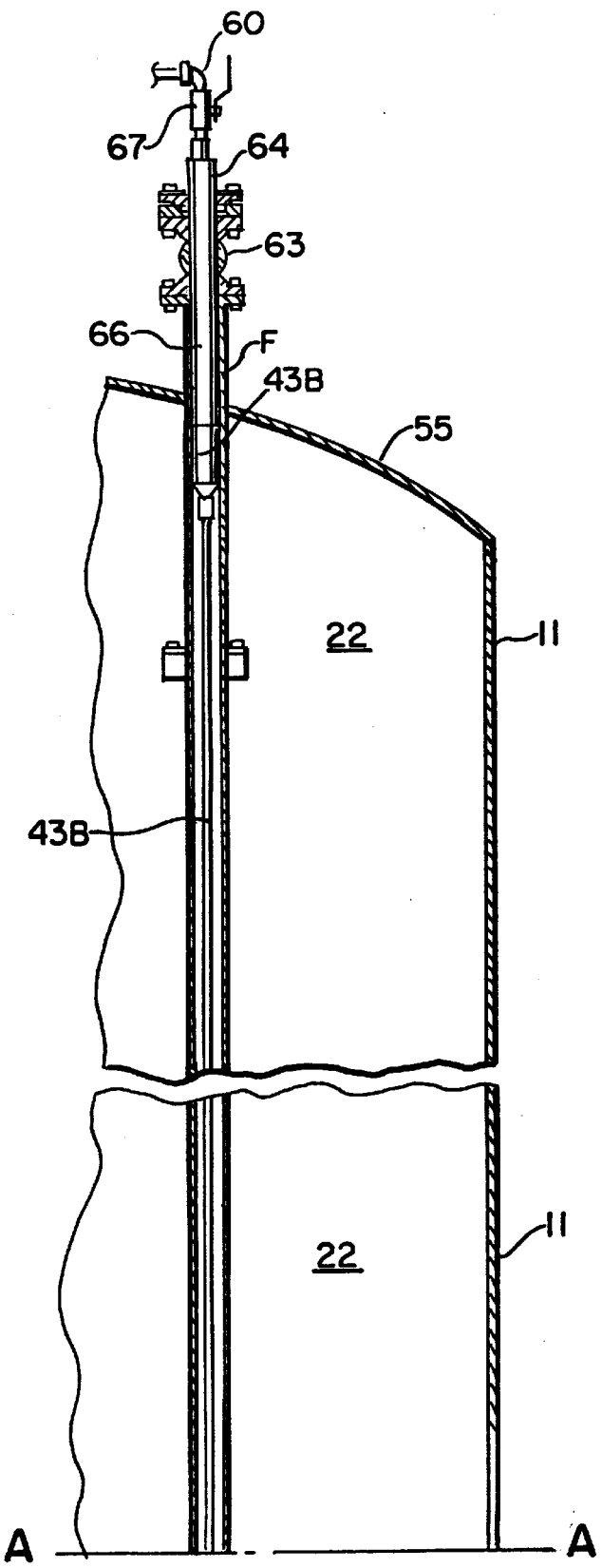

FIGS. 8A, 8B and 9 show more particularly the construction of an individual sparger line. In FIG. 9, one of the sparger lines (such as sparger line 41A) is shown having an upper end portion 60 and a lower end portion 61. The sparger line 41A is attached to fitting F that is welded to the cap 55 of vessel 11. Fitting F can be, for example, a commercially available weld neck type flange. Above fitting F, there is preferably provided packing element 63 through which sleeve 64 passes. Packing material at 65 prevents the escape of fluids about the outside of sleeve 64.

Sparger line 41A includes an upper pipe section 66 that is fitted to ball valve 67 and elbow fitting 68. Influent flow line 69 carries pressurized gas for use in aeration and thus treatment of wastewater contained within the interior 22 of vessel 11. A union 70 or other like fitting can be used to connect elbow 68 to influent line 69.

The lower end portion of sparger line 41A includes an elongated section of porous pipe 71 beginning at 72 and terminating at lower end portion 73. These porous pipe "bubbler" sections produce bubbles of between about 2–50 microns, preferably about 2–15 microns. Pipe section 74 above the top 72 of perforated pipe 71 can be for example, non-porous stainless steel pipe.

An alternate embodiment of the apparatus of the present invention is designated generally by the numeral 110 in FIGS. 10 and 11. Flotation pile apparatus 110 includes an elongated vertically oriented vessel 111 having an upper end portion 112 and lower end portion 113. The upper end portion 112 of vessel 111 has a produced water inlet 114. Vent opening 115 communicates between the inside or interior 122 of vessel 111 and with the exterior of vessel 111. Oil outlet 116 can be in the form of a fitting at the vessel 111 upper end portion 112. Oil can be pumped from vessel interior 122 once sufficiently accumulated at the upper end portion 112 of vessel 111.

Arrow 117 in FIG. 10 indicates schematically the flow of produced water into inlet 114 so that the produced water enters interior 122 of vessel 111. Arrow 118 in FIG. 10 schematically indicates the escape of vented gaseous material via vent 115 from the interior 122 of vessel 111 during use.

Arrow 119 in FIG. 10 schematically indicates the withdrawal of oil from the interior 122 of vessel 111 after that oil has accumulated at the upper end portion 112 of vessel 111.

As will be described more fully hereinafter, clean water exits vessel 111 at the lower end portion 113 through seawater outlet 120. The seawater outlet 120 can communicate with a discharge flow line 149 having an upper end portion with outlet fitting 150 that reaches a level near the level 124 of the surrounding seawater 123. Arrow 121 in FIG. 10 schematically indicates the discharge of clean water out through seawater outlet 120 into sea 123 (or alternatively line 149) after it has been cleaned and oil separated therefrom.

The vessel 111 is supported by a fixed platform or floating production facility at boat deck 125. This enables the large majority of vessel 111 to be submerged as shown in FIG. 10. Because the large majority of vessel 111 is submerged, it is buoyed by the seawater 123 so that minimal platform load is produced at boat deck 125.

In FIG. 10, a number of processes are provided in one apparatus 110 for waste treatment. These include free oil removal, induced gas flotation, and disposal caisson treatment. In FIG. 10, three separate zones are indicated by the arrows 126, 127 and 128. The arrow 126 indicates free oil removal zone next to the upper end portion 112 of vessel 111. At the lower end portion 113 of vessel 111, the arrow 128 indicates the disposal caisson zone. In between the zones 126 and 128 is the middle zone 127, namely induced gas flotation zone 127.

A source of gas 130 (e.g. natural gas) communicates with inlet gas flow line 129. The inlet gas flow line 129 feeds four branch lines 131, 132, 133, 134. The flowlines 131, 132, 133, 134 are at different (and spaced apart) elevational positions. Each of the branch lines 131–134 carries a control valve 135 for controlling the pressure and volume of gas that is transmitted from the gas source 130 to a plurality of gas spargers 136, 137, 138, 139. Each sparger 136–139 is fed by a branch line 131–134 respectively.

In the preferred embodiment, there are four different elevational positions in vessel 111 interior 122 that provide a gas sparger 136, 137, 138 or 139. A baffle arrangement is provided next to each of the spargers 136–139. Baffle 140 is placed next to the upper sparger 136. Baffle 141 is placed next to the sparger 137. Baffle 142 is placed next to the sparger 38 and baffle 143 is placed next to the sparger 139.

Each of the baffles 140–143 includes one or more vertical conduits 144–147 (see FIGS. 10–11). These vertical conduit 44–147 enable oil that is collected under a baffle 140–143 to rise upwardly as the oil accumulates and grows in droplet size. Oil that flows downwardly beyond one of the baffle arrangements 140–143 must pass through a central opening 151, 152, 153, 154 in each respective baffle arrangement 140–143 in order to travel beyond that particular baffle arrangement 140–143. However, spargers 136–139 are positioned directly under the respective openings 151, 152 and 153.

Any oil that flows downwardly through an opening 151–154 will likely incur gas bubbles that are being discharged from one of the spargers 136–139. In this fashion, the small bubbles (eg. 2–50 microns) generated by the spargers 136–139 will engage oil droplets and carry them upwardly toward the upper end portion 112 of vessel 111. By removing oil with bubbles at differing elevations, bubbles do not have as much opportunity to combine and grow in size. Smaller bubbles (2–50 microns) travel more slowly, removing more oil. Larger bubbles move too fast. The present invention removes oil with small bubbles at multiple elevational positions. As oil moves upwardly in the interior 122 of vessel 111, it thickens and accumulates in the free oil removal zone 126. Oil can then be removed from the interior 122 of vessel 111 via oil outlet 116 as shown by arrow 119.

The following table lists the parts numbers and parts descriptions as used herein and in the drawings attached hereto.

| Part Number | Description |
|---|---|
| 10 | flotation pile apparatus |
| 11 | vessel |
| 12 | upper end portion |
| 13 | lower end portion |
| 14 | produced water inlet |
| 15 | vent |
| 16 | solid outlet |
| 17 | arrow |
| 18 | arrow |
| 19 | arrow |
| 20 | seawater outlet pipe |
| 21 | arrow |
| 22 | vessel interior |
| 23 | seawater |
| 24 | seawater level |
| 25 | boat deck |
| 26 | free oil removal zone |
| 27 | induced gas flotation zone |
| 28 | disposal caisson zone |
| 29 | baffle |
| 30 | elbow fitting |
| 31 | inner pipe |
| 32 | outer pipe |
| 33 | space |
| 34 | arrow |
| 35 | baffle |
| 36 | baffle |
| 37 | baffle |
| 38 | baffle |
| 39 | baffle |
| 40 | baffle |
| 41A | sparger line |
| 42A | sparger line |
| 43A | sparger line |
| 44A | sparger line |
| 45A | sparger line |
| 41B | sparger line |
| 42B | sparger line |
| 43B | sparger line |
| 44B | sparger line |
| 45B | sparger line |
| 41C | sparger line |
| 42C | sparger line |
| 43C | sparger line |
| 44C | sparger line |
| 45C | sparger line |
| 41D | sparger line |
| 42D | sparger line |
| 43D | sparger line |
| 44D | sparger line |
| 45D | sparger line |
| 46 | oil riser |
| 47 | oil riser |
| 48 | oil riser |
| 49 | oil riser |
| 50 | oil riser |
| 51 | oil riser |
| 52 | space |
| 53 | space |
| 54 | space |
| 55 | cap |
| 60 | upper end sparger line |
| 61 | lower end sparger line |
| 63 | packing member |
| 64 | tube |
| 65 | packing material |
| 66 | sparger pipe |
| 67 | ball valve |
| 68 | elbow fitting |
| 69 | influent gas flowline |
| 70 | union fitting |
| 71 | perforated pipe |
| 72 | upper end |
| 73 | lower end |
| 110 | flotation pile apparatus |
| 111 | vessel |
| 112 | upper end portion |

-continued

| Part Number | Description |
| --- | --- |
| 113 | lower end portion |
| 114 | produced water inlet |
| 115 | vent |
| 116 | oil outlet flowline |
| 117 | arrow |
| 118 | arrow |
| 119 | arrow |
| 120 | seawater outlet |
| 121 | arrow |
| 122 | vessel interior |
| 123 | seawater |
| 124 | sea level |
| 125 | boat deck |
| 126 | free oil removal zone |
| 127 | induced gas flotation zone |
| 128 | disposal caisson zone |
| 129 | inlet gas flow line |
| 130 | gas source |
| 131 | branch line |
| 132 | branch line |
| 133 | branch line |
| 134 | branch line |
| 135 | control valve |
| 136 | sparger |
| 137 | sparger |
| 138 | sparger |
| 139 | sparger |
| 140 | baffle |
| 141 | baffle |
| 142 | baffle |
| 143 | baffle |
| 144 | vertical conduit |
| 145 | vertical qonduit |
| 146 | vertical conduit |
| 147 | vertical conduit |
| 148 | suction intake |
| 149 | discharge flow line |
| 150 | outlet fitting |
| 151 | opening |
| 152 | opening |
| 153 | opening |
| 154 | opening |
| 155 | oil bucket |
| 156 | weir |
| 157 | flow meter |
| 158 | pressure regulator |
| F | fitting |
| G | fitting |

The foregoing embodiments are presented by way of example only; the scope of the present invention is to be limited only by the following claims.

What is claimed is:

1. An oily water treatment apparatus for treating oily water in a marine environment comprising:
    a) a marine platform;
    b) the platform supporting a generally vertically oriented vessel having an upper end portion, a lower end portion, a side wall surrounding an interior, a length and a width, the length being many times greater than the width;
    c) a flow inlet opening at the upper end of the vessel for adding a wastewater stream to the vessel interior;
    d) an outlet opening at the lower end portion of the vessel for discharging treated water from the vessel interior;
    e) a plurality of sparger lines extending from the upper end portion of the vessel interior, said sparger lines including vertically extending porous portions that enable bubbles to be emitted therefrom, supported at differing elevational positions within said vessel interior; and
    f) a source of gas that supplies gas to the sparger lines.

2. The oily water treatment apparatus of claim 1 further comprising a plurality of baffles positioned at differing elevational positions within the interior.

3. The apparatus of claim 1 wherein the platform is fixed.

4. The apparatus so claim 1 wherein the platform is floating.

5. The apparatus of claim 1 wherein the platform is semi-submersible.

6. An oily water treatment apparatus for treating oily water in a marine environment comprising:
    a) a marine platform;
    b) the platform supporting a generally vertically oriented vessel having an upper end portion, a lower end portion, a side wall surrounding an interior, a length and a width, the length being many times greater than the width;
    c) a flow inlet at the upper end of the vessel for adding a wastewater stream to the vessel interior;
    d) an outlet at the lower end portion of the vessel for discharging treated water from the vessel interior;
    e) a plurality of sparser lines extending from the upper end portion of the vessel interior, said sparser lines including porous portions supported at differing elevational positions within said vessel interior;
    f) a source of gas that supplies gas to the sparser lines;
    g) a plurality of baffles positioned at differing elevational positions within the interior; and
    h) wherein at least some of the baffles are positioned at the same general elevational position.

7. An oily water treatment apparatus for treating oily water in a marine environment comprising:
    a) a marine platform;
    b) the platform supporting a generally vertically oriented vessel having an upper end portion, a lower end portion, a side wall surrounding an interior, a length and a width, the length being many times greater than the width;
    c) a flow inlet at the upper end of the vessel for adding a wastewater stream to the vessel interior;
    d) an outlet at the lower end portion of the vessel for discharging treated water from the vessel interior;
    e) a plurality of sparger lines extending from the upper end portion of the vessel interior, said sparger lines including porous portions supported at differing elevational positions within said vessel interior;
    f) a source of gas that supplies gas to the sparger lines;
    g) a plurality of baffles positioned at differing elevational positions within the interior; and
    h) further comprising oil accumulation flow lines supported by the baffles.

8. The apparatus of claim 1 wherein the upper end portion of the vessel includes an end cap portion through which the sparger lines extend.

9. The apparatus of claim 1 wherein the porous portion extends over a distance of at least a few feet.

10. The apparatus of claim 1 wherein the porous portion is comprised of a porous metal section.

11. An oily water treatment apparatus for treating oily water in a marine environment comprising:
    a) a marine platform;

b) the platform supporting a generally vertically oriented vessel having an upper end portion, a lower end portion, a side wall surrounding an interior, a length and a width, the length being many times greater than the width;

c) a flow inlet at the upper end of the vessel for adding a wastewater stream to the vessel interior;

d) an outlet at the lower end portion of the vessel for discharging treated water from the vessel interior;

e) a plurality of sparger lines extending from the upper end portion of the vessel interior, said sparger lines including porous portions supported at differing elevational positions within said vessel interior; and f) a source of gas that supplies gas to the sparger lines;

g) a plurality of baffles positioned at differing elevational positions within the interior; and h) wherein the baffles include baffles at different circumferential positions.

12. The apparatus of claim 2 wherein the baffles include multiple pairs of baffles, each pair positioned at a different elevational position.

13. An oily water treatment apparatus for treating oily water in a marine environment comprising:

a) a marine platform;

b) the platform supporting a generally vertically oriented vessel having an upper end portion, a lower end portion, a side wall surrounding an interior, a length and a width, the length being many times greater than the width;

c) a flow inlet at the upper end of the vessel for adding a wastewater stream to the vessel interior;

d) an outlet at the lower end portion of the vessel for discharging treated water from the vessel interior;

e) a plurality of sparger lines extending from the upper end portion of the vessel interior, said sparger lines including porous portions supported at differing elevational positions within said vessel interior; and f) a source of gas that supplies gas to the sparger lines;

g) a plurality of baffles positioned at differing elevational positions within the interior; and h) wherein the baffles include at least one pair of baffles at a common elevational position with a gap therebetween.

14. The apparatus of claim 2 wherein each baffle is mounted to the vessel side wall.

15. The apparatus of claim 2 wherein each baffle is mounted continuously to the side wall forming a receptacle for trapping rising oil droplets during use.

16. The apparatus of claim 1 further comprising a plurality of fittings having seals that enable removal of a selected sparger line from the vessel through the fitting for maintenance purposes.

17. The apparatus of claim 16 wherein the fittings include flanged spool pieces on the upper end portion of the vessel.

18. The apparatus of claim 16 wherein each fitting includes a valving member.

19. The apparatus of claim 1 further comprising an outlet flowline that extends from the lower end portion of the vessel externally of the vessel and upwardly to a position next to the upper end portion of the vessel.

20. The apparatus of claim 19 wherein the outlet flowline includes concentric pipe portions.

21. An oily water treatment apparatus for treating oily water in a marine environment comprising:

a) a generally vertically oriented vessel having an upper end portion, a lower end portion, a wall surrounding an interior, a length, a width, the length being many times greater than the width;

b) a flow inlet at the upper end of the vessel for adding a wastewater stream to the vessel interior;

c) an outlet for discharging treated water from the vessel interior;

d) a plurality of sparger lines supported within the vessel interior, said sparger lines including porous portions supported at differing elevational positions within said vessel interior;

e) a source of gas that supplies gas to the sparger lines; and f) one or more pressure regulators for controlling the pressure at the porous portions to provide more gas pressure at greater water depth and less gas pressure at lesser water depth.

22. The oily water treatment apparatus of claim 21 further comprising a plurality of baffles positioned at differing elevational positions within the interior.

23. A wastewater treatment apparatus for use in an offshore marine environment comprising:

a) a vertically elongated vessel having upper and lower end portions, and an interior for containing fluid during use;

b) means for attaching the vessel to an offshore marine structure wherein at least half of the vessel is submerged during use;

c) an influent opening for adding produced wastewater to the interior of the vessel;

d) an effluent opening for discharging fluid from said vessel interior;

e) the upper end portion of said vessel interior defining a free oil separation section, the lower end portion of said vessel interior defining a disposal section and the middle section of said vessel interior defining an induced gas flotation section of said vessel interior;

f) a plurality of spargers having vertically extended portions that emit gas bubbles at respective, multiple elevational positions within the vessel interior;

g) an oil removal flow line for removing oil from the upper section of said vessel interior; and h) wherein said vessel lower section communicates with a discharge pipe to discharge treated water from said vessel interior via the discharge pipe.

24. The wastewater treatment apparatus of claim 23 further comprising a plurality of inclined baffles positioned at respective multiple elevational positions within the middle section of said vessel interior.

25. The wastewater treatment apparatus of claim 23 wherein the discharge is an opening that communicates with the surrounding marine environment.

26. The wastewater treatment apparatus of claim 23 wherein substantially all of the vessel is submerged during use.

27. The wastewater treatment apparatus of claim 23 wherein the spargers are positioned at three separate elevational positions.

28. The wastewater treatment apparatus of claim 23 wherein the spargers are positioned at four separate elevational positions.

29. A wastewater treatment apparatus for use in an offshore marine environment comprising:

a) a vertically elongated vessel having upper and lower end portions, and an interior for containing fluid during use;

b) means for attaching the vessel to an offshore marine structure wherein at least half of the vessel is submerged during use;

c) an influent for adding produced wastewater to the interior of the vessel;

d) an effluent for discharging fluid from said vessel interior;

e) the upper end portion of said vessel interior defining a free oil separation section, the lower end portion of said vessel interior defining a disposal section and the middle section of said vessel interior defining an induced gas flotation section of said vessel interior;

f) a plurality of shargers for emitting gas bubbles at respective, multiple elevational positions within the vessel interior;

g) an oil removal flow line for removing oil from the upper section of said vessel interior;

h) wherein said vessel lower section communicates with a discharge pipe to discharge treated water from said vessel interior via the discharge pipe; and i) wherein the inclined baffles are positioned next to one of said spargers.

30. The wastewater treatment apparatus of claim 23 wherein there are multiple spargers positioned at laterally spaced apart positions.

31. The wastewater treatment apparatus of claim 23 wherein at multiple vertically spaced apart elevational positions, there are multiple spargers positioned at laterally spaced apart positions.

32. The wastewater treatment apparatus of claim 23 wherein the discharge communicates with an outlet flow line that extends to an elevational position near the fluid surface elevation inside the vessel interior.

33. A wastewater treatment apparatus for use in offshore marine environment comprising:

a) a vertically elongated vessel having upper and lower end portions and an interior for containing fluid during use;

b) means for attaching the vessel to an offshore marine structure in a position that submerges a majority of said vessel;

c) an influent opening for adding produced wastewater to the interior of the vessel;

d) an effluent opening for discharging treated fluid from the lower end portion of said vessel interior into the surrounding marine environment;

e) the upper end portion of said vessel interior defining a free oil separation section, the lower end portion of said vessel interior defining a disposal section and the middle section of said vessel interior defining an induced gas flotation section of said vessel;

f) a plurality of spargers for emitting gas bubbles at respective multiple elevational positions within the middle section of said vessel interior;

g) pressure regulation means for regulating pressure in each sparger so that small bubbles are produced by each sparger;

h) a plurality of inclined baffles positioned at respective multiple elevational positions within the middle section of said vessel interior;

i) at least one oil removal flow line for removing oil from the upper section of said vessel interior; and j) wherein said vessel lower section communicates with said discharge to discharge treated water from said vessel interior via the discharge.

34. A wastewater treatment apparatus for use in an offshore marine environment comprising:

a) a vertically elongated vessel having upper and lower end portions and a middle portion therebetween, and an interior for containing fluid during use;

b) the vessel being attached to an offshore marine structure wherein at least half of the vessel is submerged during use;

c) an influent opening for adding produced wastewater to the interior of the vessel;

d) an effluent opening for discharging fluid from said vessel interior;

e) the upper end portion of said vessel interior defining a free oil separation section, the lower end portion of said vessel interior defining a disposal section and the middle section of said vessel interior defining an induced gas flotation section of said vessel interior;

f) sparger means for emitting gas bubbles of generally constant diameter of between 2 and 50 microns at respective multiple elevational positions at the middle section of said vessel interior;

g) a plurality of baffles positioned at respective multiple elevational positions within the middle section of said vessel interior;

h) openings in each baffle enabling oil that accumulated next to a baffle to rise in the vessel by traveling through a baffle opening;

i) an oil removal flow line for removing oil from the upper section of said vessel interior; and j) wherein said vessel lower section communicates with said discharge to discharge treated water from said vessel interior via the discharge.

35. The wastewater treatment apparatus of claim 34 wherein the discharge is an opening that communicates with the surrounding marine environment.

36. The wastewater treatment apparatus of claim 34 wherein a substantially all of the vessel is submerged during use.

37. The wastewater treatment apparatus of claim 34 wherein the sparger means comprises multiple spargers positioned at three separate elevational positions.

38. The wastewater treatment apparatus of claim 34 wherein the sparger means comprises multiple spargers positioned at four separate elevational positions.

39. The wastewater treatment apparatus of claim 34 wherein the baffles are inclined baffles.

40. The wastewater treatment apparatus of claim 34 wherein there are multiple spargers positioned at laterally spaced apart positions.

41. The wastewater treatment apparatus of claim 34 wherein the discharge communicates with an outlet flow line that extends to an elevational position near the fluid surface elevation inside the vessel interior, so that treated water discharges near said fluid surface elevation.

42. A wastewater treatment apparatus for use in offshore marine environment comprising:

a) a vertically elongated vessel having upper and lower end portions and an interior for containing fluid during use;

b) the vessel having a height and a diameter, the height being many times greater than the diameter;

c) the vessel being attached to an offshore marine structure in a position that submerges a majority of said vessel;

d) an influent opening for adding produced wastewater to the interior of the vessel;

e) an effluent opening for discharging treated water from the vessel interior into the surrounding marine environment;

f) the upper end portion of said vessel interior defining a free oil separation section, the lower end portion of said vessel interior defining a disposal section, and the middle section of said vessel interior defining an induced gas flotation section of said vessel;

g) a sparger piping system for emitting gas bubbles at various elevational positions within the vessel interior and that includes one or more pressure regulators for controlling the pressure in said piping system to provide more gas pressure at greater water depth and less gas pressure at lesser water depth;

h) a plurality of baffle means positioned at respective multiple elevational positions within the vessel interior for accumulating oil thereon;

i) an oil removal flow line for removing oil from the vessel interior; and j) wherein said vessel lower section communicates with said discharge to discharge treated water from said vessel interior.

43. The wastewater treatment apparatus of claim 42 wherein each sparger is removable through the upper end portion of the vessel.

44. The wastewater treatment apparatus of claim 42 further comprising a plurality of spargers and wherein the vessel has an upper cap, and there are a plurality of fittings on the cap, an each sparger is supported at the cap by a fitting.

45. A wastewater treatment apparatus for use in offshore marine environment comprising:

a) a vertically elongated vessel having upper and lower end portions and an interior for containing fluid during use;

b) the vessel having a height and a diameter, the height being many times greater than the diameter;

c) the vessel being attached to an offshore marine structure in a position that submerges a majority of said vessel;

d) an influent for adding produced wastewater to the interior of the vessel;

e) an effluent for discharging treated water from the vessel interior into the surrounding marine environment;

f) the upper end portion of said vessel interior defining a free oil separation section, the lower end portion of said vessel interior defining a disposal section, and the middle section of said vessel interior defining an induced gas flotation section of said vessel;

g) a sparger for emitting gas bubbles within the vessel interior;

h) a plurality of baffle means positioned at respective multiple elevational positions within the vessel interior for accumulating oil thereon;

i) an oil removal flow line for removing oil from the vessel interior; and j) wherein said vessel lower section communicates with said discharge to discharge treated water from said vessel interior; and k) wherein the baffles are placed at circumferentially different positions on the vessel interior at different elevations.

46. The wastewater treatment apparatus of claim 42 wherein the vessel is separated into four treatment cells by the plurality of baffles.

47. The wastewater treatment apparatus of claim 44 wherein a plurality of the spargers are generally vertically positioned.

48. The wastewater treatment apparatus of claim 42 wherein the spargers produce bubbles in the range of between about 2–50 microns in diameter.

49. The wastewater treatment apparatus of claim 44 wherein the spargers produce bubbles in the range of between about 2–50 microns in diameter.

50. The wastewater treatment apparatus of claim 44 wherein a plurality of the spargers are tubes, each comprised of a lower porous metal bubbler section and an upper non-porous section.

51. A wastewater treatment apparatus for use in offshore marine environment comprising:

a) a vertically elongated vessel having upper and lower end portions and an interior for containing fluid during use;

b) the vessel having a height and a diameter, the height being many times greater than the diameter;

c) the vessel being attached to an offshore marine structure in a position that submerges a majority of said vessel;

d) an influent for adding produced wastewater to the interior of the vessel;

e) an effluent for discharging treated water from the vessel interior into the surrounding marine environment;

f) the upper end portion of said vessel interior defining a free oil separation section, the lower end portion of said vessel interior defining a disposal section, and the middle section of said vessel interior defining an induced gas flotation section of said vessel;

g) a sparger for emitting gas bubbles within the vessel interior;

h) a plurality of baffle means positioned at respective multiple elevational positions within the vessel interior for accumulating oil thereon;

i) an oil removal flow line for removing oil from the vessel interior; and j) wherein said vessel lower section communicates with said discharge to discharge treated water from said vessel interior;

k) a plurality of spargers and wherein the vessel has an upper cap, and there are a plurality of fittings on the cap, and each sparger is supported at the cap by a fitting;

l) wherein a plurality of the spargers are tubes, each comprised of a lower porous metal bubbler section and an upper non-porous section; and m) wherein the spargers include porous bubbler sections supported within the vessel at multiple, different elevational positions.

\* \* \* \* \*